(12) United States Patent
Katz

(10) Patent No.: US 12,533,645 B1
(45) Date of Patent: Jan. 27, 2026

(54) MIXER

(71) Applicant: Guilad Katz, Brooklyn, NY (US)

(72) Inventor: Guilad Katz, Brooklyn, NY (US)

( * ) Notice: Subject to any disclaimer, the term of this patent is extended or adjusted under 35 U.S.C. 154(b) by 0 days.

(21) Appl. No.: 19/238,347

(22) Filed: Jun. 13, 2025

(51) Int. Cl.
*B01F 27/00* (2022.01)
*B01F 23/53* (2022.01)
*B01F 27/054* (2022.01)
*B01F 27/112* (2022.01)

(52) U.S. Cl.
CPC ............ *B01F 27/112* (2022.01); *B01F 23/53* (2022.01); *B01F 27/054* (2022.01)

(58) Field of Classification Search
CPC .... B01F 27/112; B01F 23/53; B01F 27/1125; B01F 23/233; B01F 23/2351; B01F 27/054
See application file for complete search history.

(56) References Cited

U.S. PATENT DOCUMENTS

| | | | | |
|---|---|---|---|---|
| 3,491,880 | A * | 1/1970 | Reck .................. | B03D 1/1418 |
| | | | | 261/87 |
| 4,681,711 | A * | 7/1987 | Eaton .................. | B01F 33/503 |
| | | | | 261/120 |
| 5,366,286 | A * | 11/1994 | Ruttimann .......... | A47J 43/0705 |
| | | | | 366/331 |
| 2007/0152357 | A1* | 7/2007 | Matsumoto ....... | B01F 23/23341 |
| | | | | 261/84 |

\* cited by examiner

*Primary Examiner* — Anshu Bhatia
(74) *Attorney, Agent, or Firm* — Stefan Knirr

(57) ABSTRACT

A mixer includes a shaft; and a mixing head attached to an end of the shaft in fixed rotative relation with the shaft, said mixing head comprising a plurality of protruding members protruding laterally relative to a longitudinal axis of the shaft, the mixing head having a transverse cross-sectional shape of a curvilinear polygon, defined by sides having a concave section.

24 Claims, 1 Drawing Sheet

MIXER

FIELD OF THE INVENTION

The present invention relates generally to devices for mixing liquids and, more particularly, to a mixer designed for mixing viscous liquids such as resin or plaster.

BACKGROUND OF THE INVENTION

Mixing devices are commonly used in various industrial and artisanal applications for combining liquids to achieve a homogeneous mixture. In particular, viscous materials such as resin, plaster, and similar compounds require thorough mixing to ensure uniform consistency and performance in the final product. Conventional mixers, including mechanical paddles and hand-held mixing tools, are widely used for this purpose.

In mixing applications involving viscous materials such as resins, plasters, and similar compounds, cleanability of the stirrer between uses is a critical concern. Conventional mixing devices often retain residual material that is difficult to remove, particularly after the material begins to set or harden. Cleaning such devices typically requires considerable effort, use of solvents, or complete disassembly, all of which increase downtime and operational inefficiency. More importantly, incomplete cleaning can result in cross-contamination between batches-potentially compromising the consistency, color, chemical properties, or structural integrity of the final product. This is especially problematic in settings that require frequent material changes, stringent cleanliness, or high-quality output.

Another limitation of many conventional stirrers is the tendency to abrade or gouge the inner surfaces of mixing containers. This is particularly common when mixing dense or particulate-laden materials. Such may introduce unwanted particulates into the mixture, negatively affecting product purity, finish, or mechanical performance.

Additionally, traditional stirrers can inadvertently incorporate air into the mixture during operation. Entrained air can form bubbles that compromise the homogeneity, curing characteristics, or surface quality of the final product-outcomes that are undesirable in most precision or high-performance applications.

It is an object of the present application to provide a stirrer that is easier to clean between uses, thereby reducing downtime and minimizing the risk of cross-contamination. In addition to improved cleanability, the stirrer is configured to reduce the likelihood of container abrasion and air entrapment during mixing. These advantages are beneficial for repeated use in professional, industrial, or artisanal environments where efficiency, cleanliness, and product integrity are essential.

SUMMARY OF THE INVENTION

According to one aspect of the present invention, a mixer includes a shaft and a mixing head attached to an end of the shaft and including a plurality of protruding members extending radially from a center of the mixing head, wherein the mixing head, when viewed in transverse cross section, has a continuous outer circumference along an entire axial length thereof.

According to another advantageous feature of the invention, facing sides of adjacent protruding members can transition into one another via a concave section.

According to another advantageous feature of the invention, the concave section can be defined by a radius in a range of from 0.5 cm-20 cm.

According to another advantageous feature of the invention, facing sides of adjacent protruding members can meet so as to form a corner defined by an angle.

According to another advantageous feature of the invention, the protruding members can have a thickness in the range of $\frac{1}{16}$ in-$\frac{3}{4}$ in.

According to another advantageous feature of the invention, a radially outer edge of each of the protruding members can form an angle with a longitudinal axis of the shaft in a range of from 5-80 degrees.

According to another advantageous feature of the invention, the radially outer edge can be rounded.

According to another advantageous feature of the invention, the protruding members can protrude perpendicularly from the center of the mixing head.

According to another advantageous feature of the invention, the mixing head can include 3-10 of the protruding members.

According to another advantageous feature of the invention, the mixing head can include 3 of the protruding members.

According to another advantageous feature of the invention, the mixer can further include at least one projection laterally extending from the end of the shaft into one of the protruding members.

According to another advantageous feature of the invention, a plurality of said projections can be provided in one-to-one correspondence with the plurality of protruding members.

According to another advantageous feature of the invention, the mixing head can be made from a material selected from the group consisting of silicone, rubber and flexible polymers.

According to another advantageous feature of the invention, a tensile strength of the material can be in a range from T60-T90.

According to another aspect of the present invention, a method for mixing a liquid includes the steps of providing a mixer including includes a shaft and a mixing head attached to an end of the shaft in fixed rotative relation with the shaft, wherein the mixing head includes a plurality of protruding members protruding laterally relative to a longitudinal axis of the shaft, the mixing head having a transverse cross-sectional shape of a curvilinear polygon, defined by sides having a concave section; submerging the mixing head in a liquid, and rotating the mixing head about a longitudinal axis of the shaft.

According to another advantageous feature of the invention, the liquid can have a viscosity in a range of from 1-10000 centipoise, preferably 50-10000 centipoise, preferably 100-10000 centipoise, preferably 1000-10000 centipoise.

According to another advantageous feature of the invention, the liquid can be a member selected from the group consisting of water, plaster, epoxy resin, silicone resin, paint and concrete.

BRIEF DESCRIPTION OF THE DRAWINGS

The above and other advantages of the invention will be further described and appreciated by those skilled in the art by reference to the following detailed description of the invention, the claims and the appended drawings in which:

DETAILED DESCRIPTION OF THE INVENTION

Figure 1:
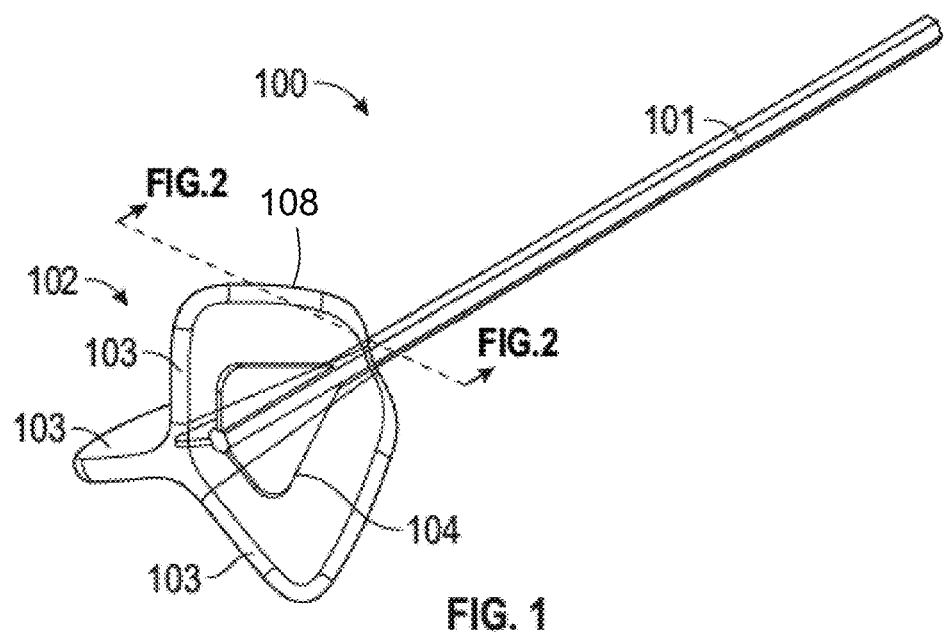
FIG. 1 shows a perspective view of an embodiment of the mixer according to the present invention.

Throughout all the Figures, the same or corresponding elements are identified by same reference numeral. The embodiments are to be understood as illustrative of the invention and not as limiting in any way. It will also be understood that the figures are not necessarily to scale and that the embodiments are sometimes illustrated by graphic symbols, phantom lines, diagrammatic representations and fragmentary views. In certain instances, details which are not necessary for an understanding of the present invention, or which render other details difficult to perceive have been omitted.

Referring now to FIG. 1, there is shown an embodiment of the mixer according to the invention and is generally designated by reference numeral 100. The mixer 100 has a shaft 101 and a mixing head 102 in fixed rotative relation with the shaft 101. In this embodiment, the mixing head 102 has three protruding members 103 laterally protruding with relative to a longitudinal axis of the shaft 101. While only three protruding members are shown in FIG. 1, other embodiments can have more of the protruding members 103 for example from 4-10 protruding members 103.

The shaft can have projections 104 projecting into the protruding members to prevent slipping of the mixing head 102 from the shaft 101 and to ensure corotation of the mixing head 102 with the shaft 101 when the shaft rotates for example when driven by a power tool such as a drill. In the embodiment of FIG. 1, three projections 104 are shown that extend into respective ones of the protruding members 103. However, in other embodiments the number of projections 104 can be less than the number of protruding members 103. For example, in the embodiment of the mixer shown in FIG. 1, only one or two of the projections 104 may be present.

Figure 2:
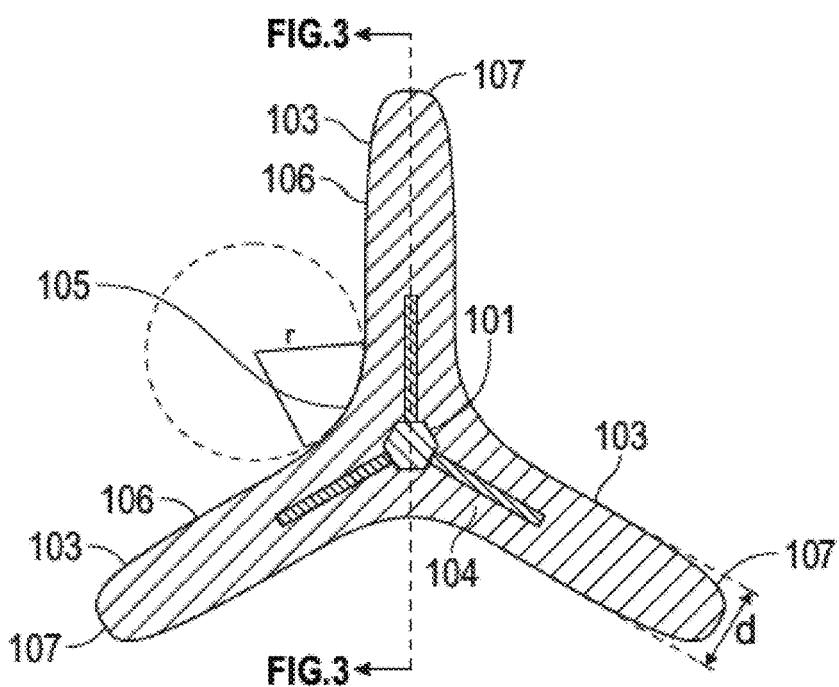
FIG. 2 shows a transverse cross-sectional view of the mixer head taken along the dashed line of FIG. 1.

Referring to FIG. 2, a transverse cross section of the mixer 100 along the dashed line shown in FIG. 1 is shown with a view taken in the direction of the arrows shown in FIG. 1. In the embodiment shown in FIG. 2, facing sides 106 of the mixing head 102 transition into one another via a concave rounded section 105 defined by a radius r. The radially edge 107 of the protruding members 103 can be rounded. The protruding members 103 can have a thickness d. The thickness is variable and can for example be in a range from 1/16 in-3/4 in. In other embodiments, the facing sides 106 of adjacent protruding members can meet so as to form a corner defined by an angle instead of the rounded concave section 105 shown in FIG. 2.

Figure 3:
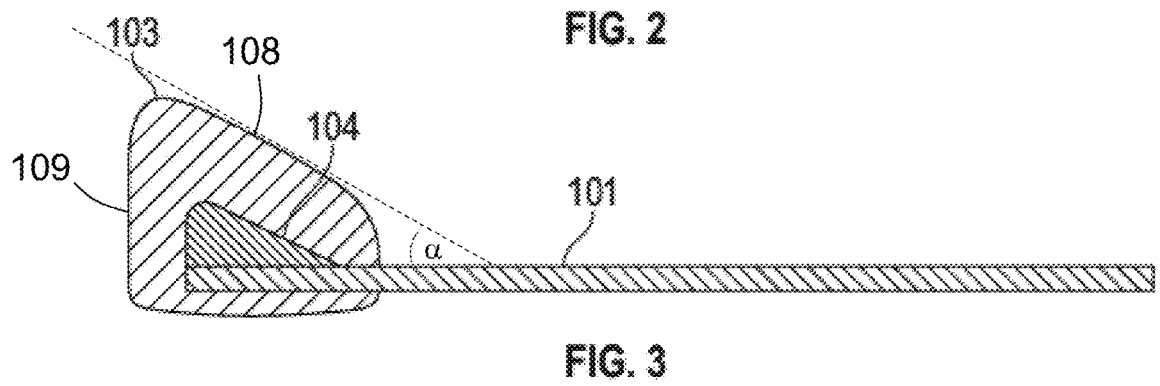
FIG. 3 shows a longitudinal cross-sectional view of the mixer taken along the dashed line of FIG. 2.

Referring to FIG. 3, a longitudinal cross section of the mixer 100 is shown along the dashed line shown in FIG. 2 with a view taken in the direction of the arrows shown in FIG. 2. FIG. 3 shows a possible longitudinal cross-sectional shape of a protruding member 103. In this embodiment, the protruding member 103 has a substantially triangular longitudinal cross-sectional shape with rounded corners. In embodiments, a radially outer edge 108 of each of the protruding members 103 can form an angle α with the shaft 101 in the range of for example 5-80 degrees. In this embodiment, the protruding members 103 have an anterior edge 109 that extends perpendicularly with respect to the shaft 101. FIG. 3 also further illustrates a possible shape of the projections 104 extending from the shaft 101 into the protruding members 103. In this embodiment the projections are also triangular shaped. In other embodiments the projections can for example be square or half circular.

Although the embodiments of the present disclosure have been illustrated in the accompanying drawings and described in the foregoing detailed description, it is to be understood that the present disclosure is not to be limited to the embodiments disclosed, but that the disclosure described herein is capable of numerous rearrangements, modifications and substitutions without departing from the scope of the claims hereafter.

The invention claimed is:

1. A mixer, comprising:
   a shaft; and
   a mixing head attached to an end of the shaft and comprising a plurality of protruding members extending radially from a center of the mixing head, with the mixing head when viewed in transverse cross section having a continuous outer circumference along an entire axial length thereof; and
   at least one projection laterally extending from the end of the shaft into one of the protruding members.

2. The mixer of claim 1, wherein facing sides of adjacent protruding members transition into one another via a concave section.

3. The mixer of claim 2, wherein the concave section is defined by a radius in a range of from 0.5 cm-20 cm.

4. The mixer of claim 2, wherein facing sides of adjacent protruding members meet so as to form a corner defined by an angle.

5. The mixer of claim 1, wherein the protruding members have a thickness in a range of 1/16 in-3/4 in.

6. The mixer of claim 1, wherein a radially outer edge of each of the protruding members forms an angle with a longitudinal axis of the shaft in a range of from 2-85.

7. The mixer of claim 6, wherein the radially outer edge is rounded.

8. The mixer of claim 6, wherein the range is from 10-75 degrees.

9. The mixer of claim 6, wherein the range is 30 degrees.

10. The mixer of claim 6, wherein the range is 45 degrees.

11. The mixer of claim 1, wherein each of the protruding members protrudes perpendicularly from the center of the mixing head.

12. The mixer of claim 1, wherein the mixing head comprises from 3-10 of said protruding members.

13. The mixer of claim 12, wherein the mixing head comprises 3 of said protruding members.

14. The mixer of claim 1, further comprising a plurality of said projections provided in one-to-one correspondence with the plurality of protruding members.

15. The mixer of claim 1, wherein the mixing head is made from a flexible material.

16. The mixer of claim 15, wherein the material has an elastic modulus in a range of from 5-200 MPa.

17. The mixer of claim 15 wherein the flexible material is selected from the group consisting of silicone, rubber and flexible polymers.

18. The mixer of claim 1, wherein the mixer head is made of a material having a tensile strength in a range from T60-T90.

19. A method for mixing a liquid, comprising:
   submerging the mixing head of the mixer of claim 1 in a liquid; and rotating the mixing head about a rotational axis of the shaft.

20. The method of claim 19, wherein the liquid has a viscosity in a range of from 1-10000 centipoise.

21. The method of claim 19, wherein the liquid is selected from the group consisting of water, plaster, epoxy resin, silicone resin, paint and concrete.

22. The method of claim 20, wherein the range is from 50-10000 centipoise.

23. The method of claim 20, wherein the range is from 100-10000 centipoise.

24. The method of claim 20, wherein the range is from 1000-10000 centipoise.

* * * * *